Patented Sept. 14, 1937

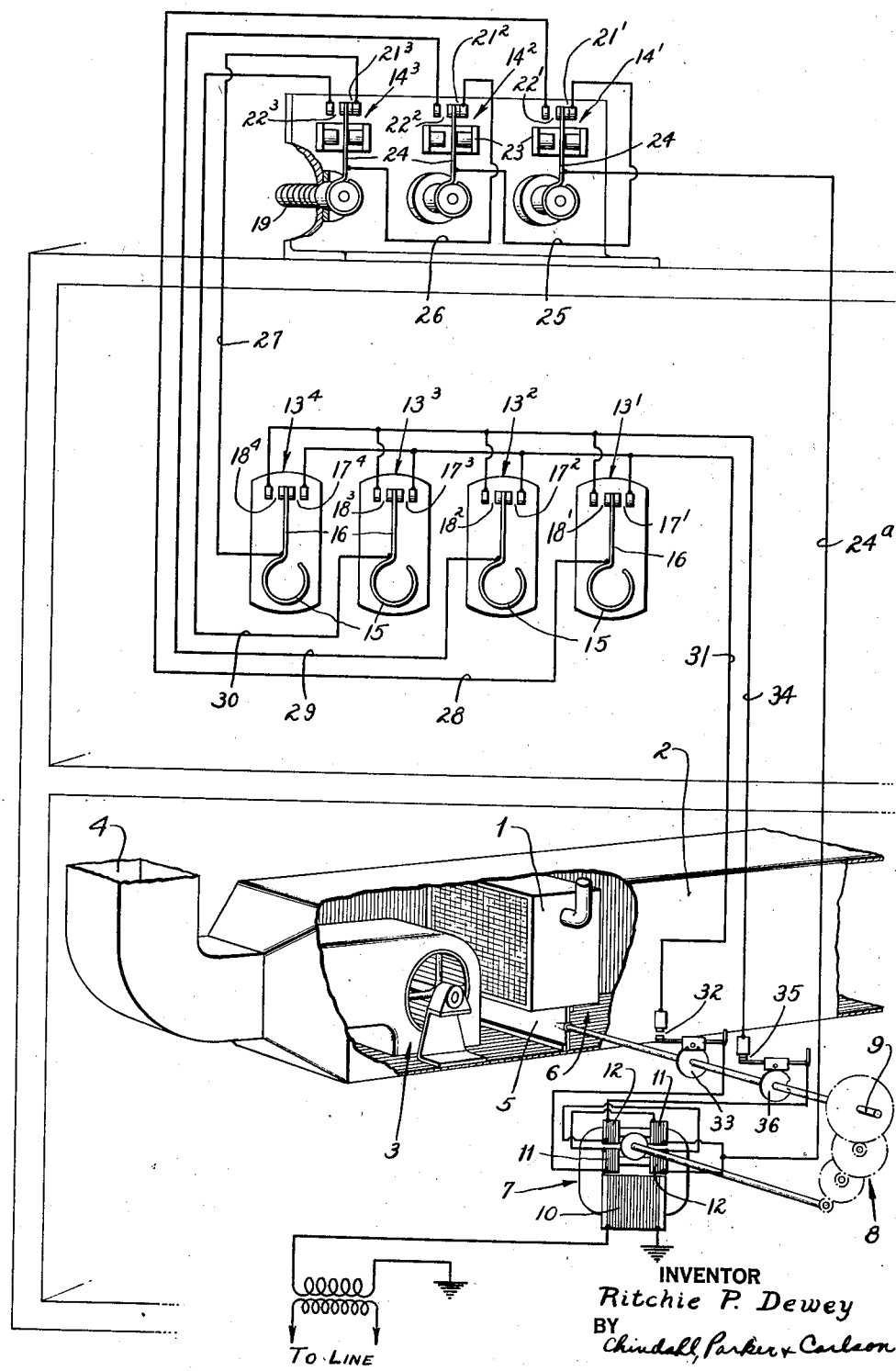

2,092,753

UNITED STATES PATENT OFFICE 2,092,753

TEMPERATURE CONTROL SYSTEM

Ritchie P. Dewey, Rockford, Ill., assignor to Howard D. Colman, Rockford, Ill.

Application November 11, 1932, Serial No. 642,182

3 Claims. (Cl. 236—91)

This invention relates generally to temperature control in systems for heating, cooling or ventilating space within a building and more particularly to a system in which the medium whose temperature is to be regulated is maintained at different predetermined temperatures under thermostatic control according to temperature changes in a controlling medium such as the air outside of the building.

The primary object of the present invention is to provide a novel inexpensive and reliable means for carrying out the above result.

Another object is to provide a novel control system of the above character wherein the temperature at which the regulated medium is maintained is varied or adjusted automatically in a plurality of increments according to temperature changes of the controlling medium.

In the embodiment of the invention selected for the purpose of illustration and shown in the accompanying drawing, the air outside of the building to be heated or cooled constitutes the controlling medium above referred to and the regulated medium is air within a space into which conditioned air is discharged from the outlet 4 of a duct 2 through which a current of air is forced by a power-driven blower 3. The air entering the duct 2 may be fresh or recirculated or both and may be heated or cooled to the proper temperature by a coil 1 supplied with heating or refrigerating fluid. Regulation of the temperature of the regulated medium may be effected in many ways depending on the type of control system to which the invention is applied. For example, the regulation may consist in starting and stopping an oil burner, opening and closing the draft of a solid fuel burner, interrupting and resuming the flow of heating fluid, or varying the proportion in which air currents are mixed. Herein the regulating device shown by way of illustration is in the form of a damper 5 disposed in a by-passage 6 and acting by movement between closed and open positions to vary the proportion of the air which is exposed to the coil 1 in passing through the duct 2 and accordingly changing the temperature within the space whose temperature is to be maintained substantially constant.

In the present instance, the damper is actuated by electric driving means in the form of a motor 7 connected through speed-reduction gearing 8 to a shaft 9 coupled to the damper. Preferably, a reversible motor is used for the application herein illustrated, the motor shown being of the shading ring induction type having a main winding 10 constantly excited by alternating current and pairs of multiple turn shading coils 11 and 12 adapted to be short-circuited selectively to initiate rotation in one direction or the other and movement of the damper toward closed and open positions respectively.

The present invention contemplates control of the circuits for the motor windings by one of at least two independently operable thermostats 13 set to respond to different predetermined temperatures of the regulated medium and adapted to be placed in control of the motor one at a time according to temperature changes in the controlling medium detected by at least one thermostat 14. Herein there are four main controlling thermostats numbered $13^1$, $13^2$, $13^3$ and $13^4$, and three transfer thermostats numbered $14^1$, $14^2$ and $14^3$. The thermostats 13 each comprise a thermo-sensitive element 15 positioned within the space whose temperature is to be regulated and adapted to move a tongue or common switch terminal 16 to close switches 17 and 18 depending on whether the temperature detected is above or below the value for which the thermostat is set to respond, at which both of the switches 17 and 18 may be open.

The thermostats 14 operate to determine which of the thermostats 13 will, at any time, be in active control of the motor and each has a thermo-sensitive element 19 exposed to the controlling medium, that is the air outside of the building. One or the other of two switches 21 and 22 is thus maintained closed depending on whether the controlling medium is above or below the temperature for which the thermostat is set to respond. Means such as a magnet 23 having poles disposed on opposite sides of the thermostat tongue 24 serves to hold the common contact of switches 21 and 22 against one or the other of the stationary switch contacts and causes movement between the contacts to occur with a snap action.

In the illustrative embodiment, the motor is controlled by two circuits having a common conductor $24^a$ leading from a terminal common to the pairs of shading coils 11 and 12 to the common contact of the switches of the thermostat $14^1$. The stationary contacts of the switches $21^1$ and $21^2$ are joined respectively by conductors 25 and 26 to the common switch contacts of the thermostats $14^2$ and $14^3$ while the stationary contact of the switch $21^3$ is joined by a conductor 27 to the tongue of the thermostat $13^4$. The stationary contacts of the switches $22^1$, $22^2$ and $22^3$ are connected by conductors 28, 29 and 30 to the tongues of the thermostats 13¹, 13² and 13³ respectively.

The stationary contacts of the switches 17 are made electrically common and joined to the insulated terminal of the shading coils 11 by a conductor 31 having interposed therein a switch 32 held closed by a cam 33 in all positions of the damper shaft 9 except a limit closed position in which the switch is allowed to open. In a similar way the stationary contacts of the switches 18 are connected to the shading coils 12 through a conductor 34 having a switch 35 interposed therewith and maintained closed by a cam 36 except at the limit open position of the damper.

To illustrate the operation of the system above described, let it be assumed that the system is utilized in a combined cooling and ventilating system wherein it is desirable to maintain within the building a temperature which is maintained constant but which is lower than the temperature outside of the building by a predetermined differential so that as the outside temperature increases, the temperature to be maintained within the building is correspondingly higher. For such an application, refrigerated fluid would be supplied to the coil 1 and the thermostats 13¹, 13², 13³ and 13⁴ might be set to respond to temperatures of 77, 75, 73 and 71 degrees Fahrenheit respectively and the thermostats 14¹, 14² and 14³ set to respond to temperatures of 85, 80 and 75 degrees respectively. Now assume that the temperature outside the building is below 75 degrees. In such a case, all of the switches 21 would be closed as shown in the drawing and the conductor 24ᵃ thereby connected to the tongue of the thermostat 13⁴. Thus, the switches 17⁴ and 18⁴ would be in active control of the circuits for the shading coils 11 and 12. Under such conditions, closure of the switch 18⁴ when the temperature of the air to which the thermostat 13⁴ is exposed falls below 71 degrees would short-circuit the shading coils 12 causing the damper to be advanced toward open position thereby raising the temperature of the air discharged from the outlet 4 and therefore the temperature in the space to be conditioned. In a similar way, the shading coils 11 would be short-circuited by closure of the switch 17⁴ in response to a rise in temperature above 71 degrees and the damper would be moved toward closed position. Thus, the damper 5 is moved back and forth solely under the control of the thermostat 13⁴ to maintain a room temperature of approximately 71 degrees.

Upon a rise in the outside temperature above 75 degrees, the thermostat 14³ would open the switch 21³ and close the switch 22³ thereby withdrawing active control of the motor from the thermostat 13⁴ and transferring such control to the thermostat 13³ which would retain such control so long as an outside temperature within the range from 75 to 80 degrees prevails, during which the conditioned air would be maintained at approximately 73 degrees Fahrenheit. An increase in the outside temperature above 80 degrees would result in opening of the thermostat switch 21² and closure of the switch 22² whereupon the control would be transferred to the thermostat 13². Upon a still further rise in temperature to a point above 85 degrees, the switch 22¹ of the thermostat 14¹ would be closed and the motor placed within the control of the thermostat 13¹.

From the foregoing it will be seen that the temperature at which the regulated medium is maintained will be adjusted from time to time and in progressive increments according to the prevailing temperature of the control medium. Such adjustment of the temperature at which the regulating medium is maintained may, as in the system illustrated herein, vary directly with temperature changes of the controlling medium. Or, as would be the case when the system is employed for controlling the temperature of hot water or other heating fluid in accordance with temperature changes outside of a building, the temperature of the regulating medium would be varied inversely proportional to temperature changes of the controlling medium. Both the control thermostats 13 and the adjusting thermostats are of an inexpensive type well known to operate reliably through long periods of service. The number of thermostats in each group is of course determined by the character of regulation required and the range of temperatures to be covered.

I claim as my invention:

1. A system for maintaining different predetermined temperatures in a regulated medium according to temperature changes in a controlling medium, said system comprising, in combination, a device operable to vary the temperature of said regulated medium, electrically driven means for actuating said device, a thermostat having two switches with an electrical common terminal connected with said driving means and closed respectively when the temperature of said controlling medium rises above and falls below a predetermined value, second and third thermostats responsive to different temperatures of said regulated medium and each having two switches with an electrically common terminal and closed respectively above and below the latter temperatures, conductors connecting the common terminals of said second and third thermostats respectively to said first mentioned switches, and two control circuits for said driving means including said conductors, a conductor connecting the corresponding switches of said second and third thermostats to said driving means and a conductor connecting the other switches of said second and third thermostats to said driving means.

2. A system for maintaining different predetermined temperatures of a regulated medium in accordance with temperature changes in a controlling medium, said system comprising in combination, a device movable to increase or decrease the temperature of said regulated medium, electric driving means for said device, two thermostats responsive to different temperatures of said regulated medium and each having two switches respectively controlling said driving means to cause movement of said device to increase or decrease the temperature of the regulated medium, an auxiliary thermostat responsive to temperature changes of said controlling medium and having two switches each in series with the switches of one of said first mentioned thermostats, said last mentioned switches being closed selectively depending on whether the temperature of the controlling medium is above or below a predetermined value.

3. A system for maintaining different predetermined temperatures in a regulated medium in accordance with temperature changes in a controlling medium, said system comprising, in combination, a device movable to increase or decrease the temperature of said regulated medium, electrically actuated means controlling the movement of said device, two independently operable thermostats each having switching means respectively controlling said electrically actuated means for causing movement of said device to increase or decrease the temperature of the regulated medium, each of said thermostats having a bimetallic thermo-sensitive element whereby to permit individual selective adjustment of the effective control point of each thermostat, an auxiliary thermostat responsive to temperature changes of said controlling medium and having two switches each in series relation with the switching means of one of said first mentioned thermostats, said last mentioned switches being closed selectively depending on whether the temperature of the controlling medium is above or below a predetermined value for which the auxiliary thermostat is set.

RITCHIE P. DEWEY.